US012661556B2

(12) United States Patent
Kojima et al.

(10) Patent No.: US 12,661,556 B2
(45) Date of Patent: Jun. 23, 2026

(54) GOLF BALL

(71) Applicant: Sumitomo Rubber Industries, Ltd., Kobe (JP)

(72) Inventors: Daijiro Kojima, Kobe (JP); Takahiro Shigemitsu, Kobe (JP); Takahiro Sajima, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 148 days.

(21) Appl. No.: 18/766,702

(22) Filed: Jul. 9, 2024

(65) Prior Publication Data

US 2025/0018250 A1    Jan. 16, 2025

(30) Foreign Application Priority Data

Jul. 13, 2023    (JP) ................................. 2023-115322

(51) Int. Cl.
| | |
|---|---|
| *A63B 37/06* | (2006.01) |
| *A63B 37/00* | (2006.01) |
| *C08K 3/22* | (2006.01) |
| *C08K 5/00* | (2006.01) |
| *C08K 5/101* | (2006.01) |
| *C08K 5/14* | (2006.01) |

(Continued)

(52) U.S. Cl.
CPC ...... *A63B 37/0024* (2013.01); *A63B 37/0033* (2013.01); *A63B 37/0036* (2013.01); *A63B 37/0043* (2013.01); *A63B 37/0045* (2013.01); *A63B 37/0049* (2013.01); *A63B 37/00622* (2020.08); *A63B 37/0063* (2013.01); *A63B 37/0064* (2013.01); *A63B 37/0065* (2013.01); *A63B 37/0075* (2013.01); *A63B 37/008* (2013.01); *A63B 37/0083* (2013.01); *A63B*

*37/0087* (2013.01); *A63B 37/00922* (2020.08); *C08K 2003/2296* (2013.01); *C08K 5/0091* (2013.01); *C08K 5/101* (2013.01); *C08K 5/14* (2013.01); *C08K 13/02* (2013.01); *C08L 23/0876* (2013.01)

(58) Field of Classification Search
CPC ............ A63B 37/0037; A63B 37/0049; A63B 37/0036
See application file for complete search history.

(56) References Cited

U.S. PATENT DOCUMENTS

2013/0316851 A1* 11/2013 Sajima ............... A63B 37/0039
473/373

FOREIGN PATENT DOCUMENTS

JP          2023-004542 A       1/2023

* cited by examiner

*Primary Examiner* — Raeann Gorden
(74) *Attorney, Agent, or Firm* — XSENSUS LLP

(57) ABSTRACT

A golf ball can include a core, a mid layer, and a cover. An amount P(Na) of a sodium ion-neutralized ionomer resin in abase resin of the cover can be not greater than 5 parts by mass. The golf ball can satisfy the following mathematical formulas (1) and (2):

$$Fm/(Hm * Tm) - Fc/(Hc * Tc) \geq 3.0, \text{ and} \tag{1}$$

$$Mc * Tc \geq 10.0, \tag{2}$$

where
Hm: hardness (Shore D) of the mid layer,
Tm: thickness (mm) of the mid layer,
Fm: bending stiffness (MPa) of the mid layer,
Tc: thickness (mm) of the cover,
Fc: bending stiffness (MPa) of the cover, and (Continued)

Mc: melt flow rate (g/10 min) of the cover at a temperature of 190° C. under a load of 2.16 Kg.

15 Claims, 1 Drawing Sheet

(51) Int. Cl.

| | | |
|---|---|---|
| C08K 13/02 | (2006.01) | |
| C08L 23/0876 | (2025.01) | |

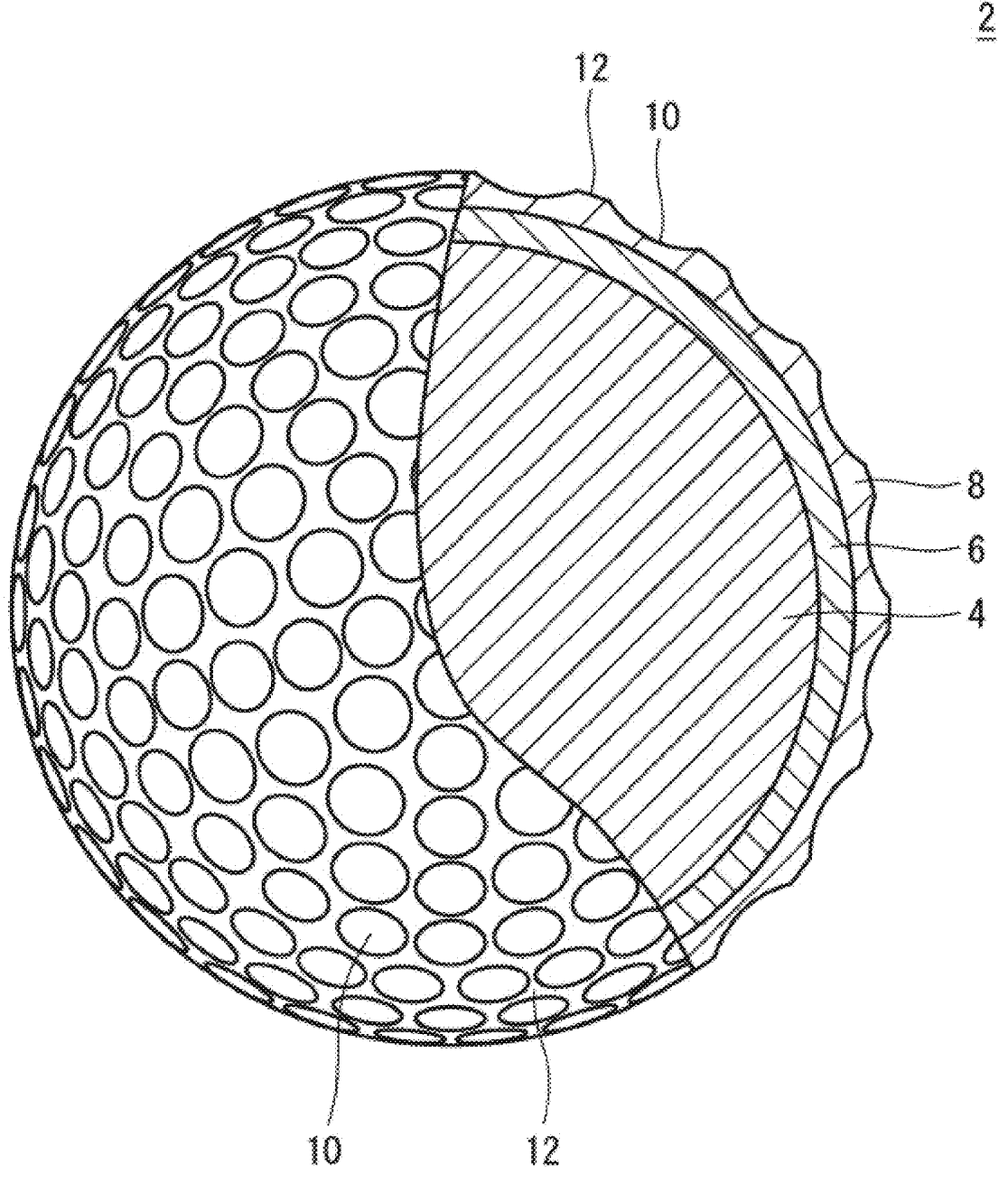

GOLF BALL

CROSS-REFERENCE TO RELATED APPLICATION

The present application claims priority to Japanese patent application JP 2023-115322, filed on Jul. 13, 2023, the entire content of which is incorporated herein by reference in its entirety.

BACKGROUND

Technical Field

The present specification discloses a golf ball that can include a core, a mid layer, and a cover.

Background Art

Ionomer resins may be known as a material for a cover of a general golf ball. Japanese Laid-Open Patent Publication No. 2023-4542 discloses a golf ball including a cover whose base resin is an ionomer.

Golf players may place importance on controllability of golf balls. The controllability can correlate to spin performance. When the rate of backspin is high, the run can be short. By using a golf ball that produces backspin with a high rate, a golf player can cause the golf ball to stop at a target point. When the rate of sidespin is high, the golf ball tends to curve. By using a golf ball that produces sidespin with a high rate, a golf player can intentionally cause the golf ball to curve.

A soft cover can contribute to a high spin rate. However, such cover may impair the resilience performance of the golf ball. The golf ball having insufficient resilience performance can have poor flight performance. By adopting a thin cover, the adverse effect of the cover on flight performance can be suppressed. However, molding a thin cover can involve difficulties. A soft cover may also have poor scuff resistance.

SUMMARY

A golf ball according to one or more embodiments of the present disclosure can include a core, a mid layer positioned outside the core and whose material is a resin composition, and a cover positioned outside the mid layer and whose material is another resin composition. A principal component of a base resin of the resin composition of the mid layer can be an ionomer resin. The cover can have a hardness Hc (Shore D) of not greater than 50. A principal component of a base resin of the resin composition of the cover can be an ionomer resin. An amount P(I) of the ionomer resin in the base resin of the cover may be not less than 60 parts by mass per 100 parts by mass of the base resin. An amount P(Na) of a sodium ion-neutralized ionomer resin in the base resin of the cover can be not greater than 5 parts by mass per 100 parts by mass of the base resin. The golf ball can satisfy the following mathematical formulas (1) and (2):

$$Fm/(Hm * Tm) - Fc/(Hc * Tc) \geq 3.0, \text{ and} \quad (1)$$

$$Mc * Tc \geq 10.0, \quad (2)$$

where
Hm: hardness (Shore D) of the mid layer,
Tm: thickness (mm) of the mid layer,
Fm: bending stiffness (MPa) of the mid layer,
Tc: thickness (mm) of the cover,
Fc: bending stiffness (MPa) of the cover, and
Mc: melt flow rate (g/10 min) of the cover at a temperature of 190° C. under a load of 2.16 Kg.

BRIEF DESCRIPTION OF THE DRAWINGS

The FIGURE is a partially cutaway cross-sectional view showing a golf ball according to one or more embodiments of the present disclosure.

DETAILED DESCRIPTION

Hereinafter, preferred embodiments will be described in detail with appropriate reference to the drawing.

It can be regarded as one intention of the present disclosure, according to one or more intentions, to provide a golf ball having excellent spin performance, flight performance, moldability, and/or scuff resistance.

The cover of a golf ball according to one or more embodiments of the present disclosure can be soft. Such golf ball can be regarded as having excellent spin performance upon an approach shot. And since the amount P(Na) of the sodium ion-neutralized ionomer resin can be relatively small, such cover can be regarded as having excellent scuff resistance even though the cover is soft. The resin of the cover can be regarded as having excellent fluidity, and thus can contribute to the moldability of the cover. The cover can be easily molded even with a small thickness. The cover having a small thickness may not impair the resilience performance of the golf ball even though the cover is soft.

The golf ball according to one or more embodiments herein can be regarded as having excellent spin performance, flight performance, moldability, and/or scuff resistance.

A golf ball 2 according to one or more embodiments of the present disclosure is shown in the FIGURE and can include a spherical core 4, a mid layer 6 positioned outside the core 4, and a cover 8 positioned outside the mid layer 6. The golf ball 2 can have a plurality of dimples 10 on the surface thereof. Of the surface of the golf ball 2, a part other than the dimples 10 can be a land 12. The golf ball 2 can include a paint layer and a mark layer on the external side of the cover 8.

The golf ball 2 can have a diameter of not less than 40 mm and not greater than 45 mm. From the viewpoint of conformity to the rules established by the United States Golf Association (USGA), the diameter can be not less than 42.67 mm. From the viewpoint of suppression of air resistance, the diameter can be not greater than 44 mm, for instance, not greater than 42.80 mm.

The golf ball 2 can have a mass of not less than 40 g and not greater than 50 g, according to one or more embodiments of the present disclosure. From the viewpoint of attainment of great inertia, the mass may be not less than 44 g, for instance, not less than 45.00 g. From the viewpoint of conformity to the rules established by the USGA, the mass can be not greater than 45.93 g.

The core 4 can be formed by crosslinking a rubber composition. Examples of base rubbers for the rubber composition according to one or more embodiments of the present disclosure can include polybutadienes, polyisoprenes, styrene-butadiene copolymers, ethylene-propylenediene copolymers, and natural rubbers. From the viewpoint of resilience performance of the golf ball 2, polybutadienes may be preferable. When a polybutadiene and another rubber are used in combination, it may be preferred that the polybutadiene is a principal component. Specifically, the proportion of the polybutadiene to the entire base rubber can be preferably not less than 50% by mass, more preferably not less than 70% by mass, and particularly preferably not less than 80% by mass. A polybutadiene in which the proportion of cis-1,4 bonds is not less than 80% may be particularly preferable.

The rubber composition of the core 4 can contain a co-crosslinking agent. Co-crosslinking agents from the viewpoint of durability and resilience performance of the golf ball 2 can be monovalent or bivalent metal salts of an α,β-unsaturated carboxylic acid having 2 to 8 carbon atoms, for instance. Examples of co-crosslinking agents can include zinc acrylate, magnesium acrylate, zinc methacrylate, and magnesium methacrylate. Zinc acrylate and zinc methacrylate may be preferable.

The rubber composition may contain a metal oxide and an α,β-unsaturated carboxylic acid having 2 to 8 carbon atoms, for instance. They both can react with each other in the rubber composition to obtain a salt. The salt can serve as a co-crosslinking agent. Examples of α,β-unsaturated carboxylic acids can include acrylic acid and methacrylic acid. Examples of metal oxides can include zinc oxide and magnesium oxide.

The amount of the co-crosslinking agent per 100 parts by mass of the base rubber can be not less than 10 parts by mass and not greater than 45 parts by mass, for instance. The golf ball 2 in which this amount is not less than 10 parts by mass may be regarded as having excellent resilience performance. From this viewpoint, this amount can be not less than 15 parts by mass, for instance, not less than 20 parts by mass. The golf ball 2 in which this amount is not greater than 45 parts by mass can be regarded as having excellent feel at impact. From this viewpoint, this amount can be not greater than 40 parts by mass, for instance, not greater than 35 parts by mass.

The rubber composition of the core 4 can contain an organic peroxide. The organic peroxide can serve as a crosslinking initiator. The organic peroxide can contribute to the durability and the resilience performance of the golf ball 2. Examples of suitable organic peroxides can include dicumyl peroxide, 1,1-bis(t-butylperoxy)-3,3,5-trimethylcyclohexane, 2,5-dimethyl-2,5-di(t-butylperoxy)hexane, and di-t-butyl peroxide. An organic peroxide with particularly high versatility can be dicumyl peroxide.

The amount of the organic peroxide per 100 parts by mass of the base rubber can be not less than 0.1 parts by mass and not greater than 3.0 parts by mass, for instance. The golf ball 2 in which this amount is not less than 0.1 parts by mass can be regarded as having excellent resilience performance. From this viewpoint, this amount can be not less than 0.3 parts by mass, for instance, not less than 0.5 parts by mass. The golf ball 2 in which this amount is not greater than 3.0 parts by mass can be regarded as having excellent feel at impact. From this viewpoint, this amount can be not greater than 2.5 parts by mass, for instance, not greater than 2.0 parts by mass.

The rubber composition of the core 4 can contain an organic sulfur compound. The organic sulfur compound can contribute to the resilience performance of the golf ball 2. Organic sulfur compounds can include naphthalenethiol compounds, benzenethiol compounds, and disulfide compounds.

Examples of naphthalenethiol compounds can include 1-naphthalenethiol, 2-naphthalenethiol, 4-chloro-1-naphthalenethiol, 4-bromo-1-naphthalenethiol, 1-chloro-2-naphthalenethiol, 1-bromo-2-naphthalenethiol, 1-fluoro-2-naphthalenethiol, 1-cyano-2-naphthalenethiol, 1-acetyl-2-naphthalenethiol, and metal salts thereof. Preferable metal salts are zinc salts.

Examples of benzenethiol compounds can include benzenethiol, 4-chlorobenzenethiol, 3-chlorobenzenethiol, 4-bromobenzenethiol, 3-bromobenzenethiol, 4-fluorobenzenethiol, 4-iodobenzenethiol, 2,5-dichlorobenzenethiol, 3,5-dichlorobenzenethiol, 2,6-dichlorobenzenethiol, 2,5-dibromobenzenethiol, 3,5-dibromobenzenethiol, 2-chloro-5-bromobenzenethiol, 2,4,6-trichlorobenzenethiol, 2,3,4,5,6-pentachlorobenzenethiol, 2,3,4,5,6-pentafluorobenzenethiol, 4-cyanobenzenethiol, 2-cyanobenzenethiol, 4-nitrobenzenethiol, 2-nitrobenzenethiol, and metal salts thereof. Preferable metal salts are zinc salts.

Examples of disulfide compounds can include diphenyl disulfide, bis(4-chlorophenyl)disulfide, bis(3-chlorophenyl) disulfide, bis(4-bromophenyl)disulfide, bis(3-bromophenyl) disulfide, bis(4-fluorophenyl)disulfide, bis(4-iodophenyl) disulfide, bis(4-cyanophenyl)disulfide, bis(2,5-dichlorophenyl)disulfide, bis(3,5-dichlorophenyl)disulfide, bis(2,6-dichlorophenyl)disulfide, bis(2,5-dibromophenyl) disulfide, bis(3,5-dibromophenyl)disulfide, bis(2-chloro-5-bromophenyl)disulfide, bis(2-cyano-5-bromophenyl)disulfide, bis(2,4,6-trichlorophenyl)disulfide, bis(2-cyano-4-chloro-6-bromophenyl)disulfide, bis(2,3,5,6-tetrachlorophenyl)disulfide, bis(2,3,4,5,6-pentachlorophenyl)disulfide, and bis(2,3,4,5,6-pentabromophenyl)disulfide.

The amount of the organic sulfur compound per 100 parts by mass of the base rubber can be not less than 0.1 parts by mass and not greater than 1.5 parts by mass, for instance. The golf ball 2 in which this amount is not less than 0.1 parts by mass can be regarded as having excellent resilience performance. From this viewpoint, this amount can be not less than 0.2 parts by mass, for instance, not less than 0.3 parts by mass. The golf ball 2 in which this amount is not greater than 1.5 parts by mass can be regarded as having excellent feel at impact. From this viewpoint, this amount can be not greater than 1.3 parts by mass, for instance, not greater than 1.1 parts by mass. Two or more organic sulfur compounds may be used in combination.

The rubber composition of the core 4 may contain a filler for the purpose of specific gravity adjustment and the like. Examples of suitable fillers can include zinc oxide, barium sulfate, calcium carbonate, and magnesium carbonate. The amount of the filler may be determined as appropriate so that the intended specific gravity of the core 4 can be achieved.

The rubber composition of the core 4 may contain various additives, such as sulfur, a carboxylic acid, a carboxylate, an anti-aging agent, a coloring agent, a plasticizer, a dispersant, and the like, each in an adequate amount. The rubber composition may contain crosslinked rubber powder or synthetic resin powder.

The core 4 can have a diameter of not less than 35.0 mm and not greater than 40.5 mm, for instance. The golf ball 2 that includes the core 4 having a diameter of not less than 35.0 mm can be regarded as having excellent resilience performance. From this viewpoint, the diameter can be not less than 36.0 mm, for instance, not less than 36.5 mm. The golf ball 2 that includes the core 4 having a diameter of not greater than 40.5 mm can be regarded as having excellent durability. From this viewpoint, the diameter can be not greater than 40.0 mm, for instance, not greater than 39.5 mm.

The core 4 can have an amount of compressive deformation Dc of not less than 3.0 mm and not greater than 5.0 mm, for instance. The golf ball 2 that includes the core 4 having an amount of compressive deformation Dc of not less than 3.0 mm can be regarded as having excellent feel at impact. From this viewpoint, the amount of compressive deformation Dc can be not less than 3.5 mm, for instance, not less than 3.8 mm. The golf ball 2 that includes the core 4 having an amount of compressive deformation Dc of not greater than 5.0 mm can be regarded as having excellent resilience performance. From this viewpoint, the amount of compressive deformation Dc can be not greater than 4.7 mm, for instance, not greater than 4.5 mm.

For measurement of the amount of compressive deformation Dc, a YAMADA type compression tester "SCH" may be used. In the tester, the core 4 can be placed on a rigid plate made of metal. Next, a cylinder made of metal gradually can descend toward the core 4. The core 4 squeezed between the bottom face of the cylinder and the hard plate can become deformed. A movement distance of the cylinder, for instance, starting from the state in which an initial load of 98 N is applied to the core 4 up to the state in which a final load of 1274 N is applied thereto, can be measured. A movement speed of the cylinder until the initial load is applied can be 0.83 mm/s, for instance. A movement speed of the cylinder after the initial load is applied until the final load is applied can be 1.67 mm/s, as an example.

The core 4 can have a central hardness Ho of not less than 40 and not greater than 65, for instance. The golf ball 2 that includes the core 4 having a central hardness Ho of not less than 40 can be regarded as having excellent resilience performance. From this viewpoint, the central hardness Ho can be not less than 45, for instance, not less than 47. The golf ball 2 that includes the core 4 having a central hardness Ho of not greater than 65 can be regarded as having excellent feel at impact. From this viewpoint, the central hardness Ho can be not greater than 60, for instance, not greater than 55.

The central hardness Ho may be measured with a Shore C type hardness scale mounted to an automated hardness meter (trade name "Digi Test II" manufactured by Heinrich Bareiss Prüfgerätebau GmbH). The hardness scale can be pressed against the central point of the cross-section of a hemisphere obtained by cutting the golf ball 2. The measurement can be conducted in an environment of 23° C., as an example.

The core 4 can have a surface hardness Hs of not less than 70 and not greater than 95, for instance. The golf ball 2 that includes the core 4 having a surface hardness Hs of not less than 70 can be regarded as having excellent resilience performance. From this viewpoint, the surface hardness Hs can be not less than 75, for instance, not less than 77. The golf ball 2 that includes the core 4 having a surface hardness Hs of not greater than 95 can be regarded as having excellent feel at impact. From this viewpoint, the surface hardness Hs can be not greater than 90, for instance, not greater than 85.

The surface hardness Hs may be measured with a Shore C type hardness scale mounted to an automated hardness meter (trade name "Digi Test II" manufactured by Heinrich Bareiss Prüfgerätebau GmbH). The hardness scale can be pressed against the surface of the core 4. The measurement can be conducted in an environment of 23° C., as an example.

The difference (Hs−Ho) between the surface hardness Hs and the central hardness Ho may be not less than 28. With the golf ball 2 that includes the core 4 having a difference (Hs−Ho) of not less than 28, spin can be suppressed upon a shot with a driver. The golf ball 2 can be regarded as having excellent flight performance upon a shot with a driver. From this viewpoint, the difference (Hs−Ho) can be not less than 29, for instance, not less than 30. From the viewpoint of the durability of the golf ball 2, the difference (Hs−Ho) can be not greater than 35, more preferably not greater than 34, and particularly preferably not greater than 33.

The mid layer 6 can be positioned outside the core 4, such as shown in the FIGURE. In the present embodiment, the mid layer 6 can be in contact with the core 4. The mid layer 6 can be formed from a resin composition. In the present embodiment, the mid layer 6 can be formed from a thermoplastic resin composition. Examples of the base polymer of the resin composition can include ionomer resins, thermoplastic polyester elastomers, thermoplastic polyamide elastomers, thermoplastic polyurethane elastomers, thermoplastic polyolefin elastomers, and thermoplastic polystyrene elastomers. Ionomer resins are particularly preferable. Ionomer resins may be regarded as being highly elastic. The golf ball 2 that includes the mid layer 6 containing an ionomer resin can be regarded as having excellent resilience performance. The golf ball 2 can be regarded as having excellent flight performance upon a shot with a driver.

An ionomer resin and another resin may be used in combination. In this case, from the viewpoint of resilience performance, the ionomer resin can be contained as the principal component of the base resin. The amount of the ionomer resin in the base resin of the mid layer 6 can be preferably not less than 50 parts by mass, more preferably not less than 60 parts by mass, and particularly preferably not less than 70 parts by mass per 100 parts by mass of the base resin.

Examples of preferable ionomer resins can include a binary ionomer resin and a ternary ionomer resin. The binary ionomer resin can be a binary copolymer that is formed with an α-olefin and an α,β-unsaturated carboxylic acid having 3 to 8 carbon atoms, for instance, and in which at least some of the carboxyl groups are neutralized with metal ions. A binary ionomer resin can contain 80% by mass or greater and 90% by mass or less of an α-olefin, and 10% by mass or greater and 20% by mass or less of an α,β-unsaturated carboxylic acid, for instance. This binary ionomer resin can be regarded as having excellent resilience performance. The ternary ionomer resin can be a ternary copolymer that is formed with an α-olefin, an α,β-unsaturated carboxylic acid having 3 to 8 carbon atoms, and an α,β-unsaturated carboxylic acid ester having 2 to 22 carbon atoms and in which at least some of the carboxyl groups are neutralized with metal ions, for instance. A ternary ionomer resin can contain 70% by mass or greater and 85% by mass or less of an α-olefin, 5% by mass or greater and 30% by mass or less of an α,β-unsaturated carboxylic acid, and 1% by mass or greater and 25% by mass or less of an α,β-unsaturated carboxylic acid ester, for instance. This ternary ionomer resin can be regarded as having excellent resilience performance. For the binary ionomer resin and the ternary ionomer resin, α-olefins can be ethylene and propylene, while α,β-unsaturated carboxylic acids can be acrylic acid and methacrylic acid. An ionomer resin can be a copolymer that is formed with ethylene and acrylic acid and in which at least some of the carboxyl groups are neutralized with metal ions. Another ionomer resin can be a copolymer that is formed with ethylene and methacrylic acid and in which at least some of the carboxyl groups are neutralized with metal ions.

Examples of metal ions for use in neutralization of the carboxyl groups included in the binary ionomer resin and the ternary ionomer resin can include sodium ions, potassium ions, lithium ions, zinc ions, calcium ions, magnesium ions, aluminum ions, and neodymium ions. The neutralization may be carried out with two or more types of metal ions. Particularly suitable metal ions from the viewpoint of resilience performance and durability of the golf ball 2 can be sodium ions, zinc ions, lithium ions, and magnesium ions.

Specific examples of ionomer resins can include trade names "HIMILAN 1555", "HIMILAN 1557", "HIMILAN 1605", "HIMILAN 1702", "HIMILAN 1706", "HIMILAN 1707", "HIMILAN 1855", "HIMILAN 1856", "HIMILAN 8150", "HIMILAN AM7311", "HIMILAN AM7315", "HIMILAN AM7317", "HIMILAN AM7327", "HIMILAN AM7329", and "HIMILAN AM7337", manufactured by DOW-MITSUI POLYCHEMICALS CO., LTD.; trade names "SURLYN 6120", "SURLYN 6910", "SURLYN 7930", "SURLYN 7940", "SURLYN 8140", "SURLYN 8150", "SURLYN 8940", "SURLYN 8945", "SURLYN 9120", "SURLYN 9150", "SURLYN 9320", "SURLYN 9910", "SURLYN 9945", "SURLYNAD8546", "HIPF1000", and "HPF2000", manufactured by DuPont de Nemours, Inc.; and trade names "IOTEK 7010", "IOTEK 7030", "IOTEK 7510", "IOTEK 7520", "IOTEK 8000", and "IOTEK 8030", manufactured by ExxonMobil Chemical Corporation. Two or more ionomer resins may be used in combination.

A resin that can be used in combination with an ionomer resin can be a styrene block-containing thermoplastic elastomer. The styrene block-containing thermoplastic elastomer can contain a polystyrene block as a hard segment, and a soft segment. A soft segment can be a diene block. Examples of compounds for the diene block can include butadiene, isoprene, 1,3-pentadiene, and 2,3-dimethyl-1,3-butadiene. Butadiene and isoprene may be preferable. Two or more compounds may be used in combination.

Examples of styrene block-containing thermoplastic elastomers can include styrene-butadiene-styrene block copolymers (SBS), styrene-isoprene-styrene block copolymers (SIS), styrene-isoprene-butadiene-styrene block copolymers (SIBS), hydrogenated SBS, hydrogenated SIS, and hydrogenated SIBS. Examples of hydrogenated SBS can include styrene-ethylene-butylene-styrene block copolymers (SEBS). Examples of hydrogenated SIS can include styrene-ethylene-propylene-styrene block copolymers (SEPS). Examples of hydrogenated SIBS can include styrene-ethylene-ethylene-propylene-styrene block copolymers (SEEPS).

From the viewpoint of the resilience performance of the golf ball 2, the content of the styrene component in the styrene block-containing thermoplastic elastomer can be not less than 1% by mass, more preferably not less than 3% by mass, and particularly preferably not less than 5% by mass. From the viewpoint of the feel at impact of the golf ball 2, this content can be preferably not greater than 50% by mass, more preferably not greater than 47% by mass, and particularly preferably not greater than 45% by mass.

In the present disclosure, styrene block-containing thermoplastic elastomers can include an alloy of an olefin and one or more members selected from the group consisting of SBS, SIS, SIBS, SEBS, SEPS, and SEEPS. The olefin component in the alloy can be presumed to contribute to improvement of compatibility with another base polymer. The alloy can contribute to the resilience performance of the golf ball 2. An olefin having 2 to 10 carbon atoms, for instance, may be preferable. Examples of suitable olefins can include ethylene, propylene, butene, and pentene. Ethylene and propylene may be particularly preferable.

Specific examples of polymer alloys can include trade names "TEFABLOC T3221C", "TEFABLOC T3339C", "TEFABLOC SJ4400N", "TEFABLOC SJ5400N", "TEFABLOC SJ6400N", "TEFABLOC SJ7400N", "TEFABLOC SJ8400N", "TEFABLOC SJ9400N", and "TEFABLOC SR04", manufactured by Mitsubishi Chemical Corporation. Other specific examples of styrene block-containing thermoplastic elastomers can include trade name "EPOFRIEND A1010" manufactured by Daicel Corporation, and trade name "SEPTON HG-252" manufactured by Kuraray Co., Ltd.

The resin composition of the mid layer 6 may contain a coloring agent, a filler, a dispersant, an antioxidant, an ultraviolet absorber, a light stabilizer, a fluorescent material, a fluorescent brightener, etc., each in an adequate amount. In the case where the hue of the golf ball 2 is white, a typical coloring agent can be titanium dioxide.

The mid layer 6 can have a thickness Tm of not less than 0.5 mm and not greater than 2.0 mm, for instance. The golf ball 2 in which the thickness Tm is not less than 0.5 mm can be regarded as having excellent resilience performance. From this viewpoint, the thickness Tm can be not less than 0.7 mm, for instance, not less than 0.8 mm. The golf ball 2 in which the thickness Tm is not greater than 2.0 mm can be regarded as having excellent feel at impact. From this viewpoint, the thickness Tm can be not greater than 1.5 mm, for instance, not greater than 1.3 mm. The thickness Tm can be measured at a position immediately below the land 12.

The mid layer 6 can have a hardness Hm of not less than 50 and not greater than 90, for instance. The golf ball 2 in which the hardness Hm is not less than 50 can be regarded as having excellent resilience performance. From this viewpoint, the hardness Hm can be not less than 55, for instance, not less than 60. The golf ball 2 in which the hardness Hm is not greater than 90 can be regarded as having excellent feel at impact. From this viewpoint, the hardness Hm can be not greater than 80, for instance, not greater than 75.

The hardness Hm of the mid layer 6 can be measured according to the standards of "ASTM-D 2240-68." The hardness Hm can be measured with a Shore D type hardness scale mounted on an automated hardness meter (trade name "Digi Test II" manufactured by Heinrich Bareiss Prüfgerätebau GmbH). For the measurement, a sheet that is formed by hot press, is formed from the same material as that of the mid layer 6, and has a thickness of about 2 mm, may be used. Prior to the measurement, the sheet may be kept at 23° C. for two weeks, for instance. At the time of measurement, three sheets may be stacked.

The mid layer 6 can have a bending stiffness Fm of not less than 280 MPa, for instance. The golf ball 2 in which the bending stiffness Fm is not less than 280 MPa can be regarded as having excellent resilience performance. From this viewpoint, the bending stiffness Fm can be not less than 290 MPa, for instance, not less than 300 MPa. From the viewpoint of the feel at impact of the golf ball 2, the bending stiffness Fm can be not greater than 420 MPa, more preferably not greater than 400 MPa, and particularly preferably not greater than 380 MPa.

The bending stiffness Fm of the mid layer 6 may be measured according to the standards of "JIS K 7106." A test piece having a thickness of 2 mm, a width of 20 mm, and a length of 100 mm, for instance, may be subjected to the measurement. Prior to the measurement, the test piece may be kept in an environment having a temperature of 23±2° C.

and a relative humidity of 50±5% for 14 days, for instance. The measurement conditions can be as follows:

Temperature: 23±2° C.
Relative humidity: 50±5%
Distance between fulcrums: 50 mm
Bending speed: 60°/min
Bending angle: 3°, 6°, 9°, and 12°

An Olsen type stiffness tester manufactured by Toyo Seiki Seisaku-sho, Ltd., for instance, can be used as a testing machine suitable for the measurement. The measurement results can be plotted on a graph with the load scale on the vertical axis and the bending angle on the horizontal axis. The slope of the first-order approximation curve of this plot can be obtained, and this slope can be multiplied by 8.7078, for instance, and then divided by the cube of the thickness (cm) of the test piece to calculate the bending stiffness Fm.

The cover 8 can be positioned outside the mid layer 6, such as shown in the FIGURE. In the present embodiment, the cover 8 can be in contact with the mid layer 6. The golf ball 2 may have an adhesive layer between the mid layer 6 and the cover 8. The cover 8 can be firmly joined to the mid layer 6 via the adhesive layer. The cover 8 can be formed from a resin composition. In the present embodiment, the cover 8 can be formed from a thermoplastic resin composition. Examples of the base polymer of the resin composition can include ionomer resins, thermoplastic polyester elastomers, thermoplastic polyamide elastomers, thermoplastic polyurethane elastomers, thermoplastic polyolefin elastomers, and thermoplastic polystyrene elastomers. Ionomer resins may be preferable. Ionomer resins can be regarded as highly elastic. The golf ball 2 according to one or more embodiments that includes the cover 8 containing an ionomer resin can be regarded as having excellent resilience performance. The golf ball 2 can be regarded as having excellent flight performance upon a shot with a driver. The ionomer resins described above for the mid layer 6 can be used for the cover 8.

An ionomer resin and another resin may be used in combination. In this case, from the viewpoint of resilience performance, the ionomer resin can be contained as the principal component of the base resin. An amount P(I) of the ionomer resin in the base resin of the cover 8 can be not less than 60 parts by mass, more preferably not less than 65 parts by mass, and particularly preferably not less than 70 parts by mass per 100 parts by mass of the base resin. The amount P(I) can be not greater than 95 parts by mass, more preferably not greater than 90 parts by mass, and particularly preferably not greater than 85 parts by mass.

The resin composition of the cover 8 can contain an ionomer resin neutralized with zinc ions. The cover 8 containing this ionomer resin can be soft but less likely to be scratched. The zinc ion-neutralized ionomer resin can compensate in which the scuff resistance may be regarded as being poor. Therefore, a low hardness can be employed for the cover 8 containing the zinc ion-neutralized ionomer resin. The cover 8 can contribute to the spin performance and the scuff resistance of the golf ball 2.

From the viewpoint of spin performance and scuff resistance, an amount P(Zn) of the zinc ion-neutralized ionomer resin in the base resin of the cover 8 can be not less than 60 parts by mass, more preferably not less than 65 parts by mass, and particularly preferably not less than 70 parts by mass per 100 parts by mass of the base resin. The amount P(Zn) can be not greater than 95 parts by mass, more preferably not greater than 90 parts by mass, and particularly preferably not greater than 85 parts by mass.

From the viewpoint of spin performance and scuff resistance, the ratio of the amount P(Zn) of the zinc ion-neutralized ionomer resin to the amount P(I) of the ionomer resin in the base resin of the cover 8 can be not less than 90%, for instance, not less than 95%. This ratio can be 100%, according to one or more embodiments of the present disclosure. The cover 8 may contain two or more zinc ion-neutralized ionomer resins that are different in hardness or fluidity from each other.

Specific examples of zinc ion-neutralized ionomer resins can include the aforementioned trade names "HIMILAN 1557", "HIMILAN 1702", "HIMILAN 1706", "HIMILAN 1855", "HIMILAN AM7327", "HIMILAN AM7329", "SURLYN 9120", "SURLYN 9150", "SURLYN 9320", "SURLYN 9945", "IOTEK 7010", "IOTEK 7030", "IOTEK 7510", and "IOTEK 7520."

From the viewpoint of scuff resistance, an amount P(Na) of a sodium ion-neutralized ionomer resin in the base resin of the cover 8 can be not greater than 5 parts by mass per 100 parts by mass of the base resin, as an example. The amount P(Na) can be 0 parts by mass %, according to one or more embodiments of the present disclosure.

The resin composition of the cover 8 may contain, together with an ionomer resin, a resin that can contribute to the fluidity thereof. The cover 8 can be easily molded even with a small thickness. The thin cover 8 may not impair the resilience performance of the golf ball 2 even though the cover 8 can be regarded as being soft. An example of the resin that can contribute to the fluidity can be a binary copolymer formed with an olefin and an α,β-unsaturated carboxylic acid. This binary copolymer may not be neutralized with metal ions. Another example of the resin that can contribute to the fluidity can be a ternary copolymer formed with an olefin, an α,β-unsaturated carboxylic acid, and an α,β-unsaturated carboxylic acid ester. This ternary copolymer may not be neutralized with metal ions. A resin having a melt flow rate of not less than 25 g/10 min may be implemented according to one or more embodiments of the present disclosure.

A total amount P(n) of the binary copolymer and the ternary copolymer can be not less than 10 parts by mass and not greater than 40 parts by mass per 100 parts by mass of the base resin of the cover 8, for instance. The cover 8 in which the total amount P(n) is not less than 10 parts by mass can be regarded as having excellent moldability. From this viewpoint, the total amount P(n) can be not less than 13 parts by mass, for instance, not less than 15 parts by mass. The cover 8 in which the total amount P(n) is not greater than 40 parts by mass can contain a sufficient amount of the zinc ion-neutralized ionomer resin. Furthermore, the cover 8 in which the total amount P(n) is not greater than 40 parts by mass can be regarded as having excellent scuff resistance. From these viewpoints, the total amount P(n) can be not greater than 35 parts by mass, for instance, not greater than 30 parts by mass.

Specific examples of unneutralized binary copolymers can include: trade names "NUCREL N1050H", "NUCREL N2050H", "NUCREL N1110H", and "NUCREL NO200H" manufactured by DOW-MITSUI POLYCHEMICALS CO., LTD.; and trade name "PRIMACOR 59801" manufactured by the Dow Chemical Company. Specific examples of unneutralized ternary copolymers can include: trade names "NUCREL AN4318" and "NUCREL AN4319" manufactured by DOW-MITSUI POLYCHEMICALS CO., LTD.; and trade names "PRIMACOR AT310" and "PRIMACOR AT320" manufactured by the Dow Chemical Company.

The resin composition of the cover 8 may contain a coloring agent, a filler, a dispersant, an antioxidant, an ultraviolet absorber, a light stabilizer, a fluorescent material, a fluorescent brightener, etc., each in an adequate amount. In the case where the hue of the golf ball 2 is white, a typical coloring agent can be titanium dioxide.

The cover 8 can have a thickness Tc of not less than 0.50 mm and not greater than 2.00 mm, for instance. The golf ball 2 in which the thickness Tc is not less than 0.50 mm can be regarded as having excellent spin performance. From this viewpoint, the thickness Tc can be not less than 0.70 mm, for instance, not less than 0.90 mm. The golf ball 2 in which the thickness Tc is not greater than 2.00 mm can be regarded as having excellent resilience performance. From this viewpoint, the thickness Tc can be not greater than 1.50 mm, for instance, not greater than 1.20 mm. The thickness Tc can be measured at a position immediately below the land 12.

The cover 8 can have a hardness Hc of not greater than 50. The cover 8 can contribute to spin performance upon an approach shot. From this viewpoint, the hardness Hc can be not greater than 49, for instance, not greater than 48. From the viewpoint of the resilience performance of the golf ball 2, the hardness Hc can be not less than 30, more preferably not less than 35, and particularly preferably not less than 40. The hardness Hc of the cover 8 can be measured by the same measurement method as for the hardness Hm of the mid layer 6.

The cover 8 can have a bending stiffness Fc of not greater than 80 MPa, for instance. The golf ball 2 in which the bending stiffness Fc is not greater than 80 MPa can be regarded as having excellent spin performance upon an approach shot. From this viewpoint, the bending stiffness Fc can be not greater than 70 MPa, for instance, not greater than 60 MPa. From the viewpoint of the resilience performance of the golf ball 2, the bending stiffness Fc can be not less than 20 MPa, more preferably not less than 30 MPa, and particularly preferably not less than 40 MPa. The bending stiffness Fc of the cover 8 can be measured by the same measurement method as for the bending stiffness Fm of the mid layer 6.

The cover 8 can have a melt flow rate Mc of not less than 8.0 g/10 min, for instance. The resin composition of the cover 8 can be regarded as having excellent fluidity. A thin cover 8 can be easily molded from this resin composition. From this viewpoint, the melt flow rate Mc can be not less than 9.0 g/10 min, for instance, not less than 10.0 g/10 min. The melt flow rate Mc can be not greater than 16.0 g/10 min, for instance.

The melt flow rate Mc can be measured according to the standards of "JIS K 7210-1: 2014." The measurement conditions can be as follows:

Reference: mass (method A)
Temperature: 190° C.
Load: 2.16 Kg
Die: standard

"Flowtester CFT-100C" manufactured by SHIMADZU CORPORATION is exemplified as a device suitable for the measurement.

The golf ball 2 according to one or more embodiments of the present disclosure can satisfy the following mathematical formula (2):

$$Mc * Tc \geq 10.0. \tag{2}$$

In other words, the product (Mc*Tc) of the thickness Tc and the melt flow rate Mc in the cover 8 can be not less than 10.0. The cover 8 can be regarded as having excellent moldability even though the cover 8 can be regarded as thin. From the viewpoint of moldability, the product (Mc*Tc) can be not less than 10.1, for instance, not less than 10.2. The product (Mc*Tc) can be not greater than 20.0, more preferably not greater than 18.0, and particularly preferably not greater than 16.0.

The golf ball 2 according to one or more embodiments of the present disclosure can satisfy the following mathematical formula (1):

$$Fm/(Hm * Tm) - Fc/(Hc * Tc) \geq 3.0 \tag{1}$$

In other words, the difference (Fm/(Hm*Tm)−Fc/(Hc*Tc)) can be not less than 3.0. In the golf ball 2, the mid layer 6 can contribute to flight performance, and the cover 8 can contribute to spin performance. From this viewpoint, the difference (Fm/(Hm*Tm)−Fc/(Hc*Tc)) can be not less than 3.2, for instance, not less than 3.4. The difference (Fm/(Hm*Tm)−Fc/(Hc*Tc)) can be not greater than 6.0, more preferably not greater than 5.5, and particularly preferably not greater than 5.0.

The golf ball 2 can have an amount of compressive deformation Db of not less than 2.5 mm and not greater than 4.0 mm, for instance. The golf ball 2 having an amount of compressive deformation Db of not less than 2.5 mm can be regarded as having excellent feel at impact. From this viewpoint, the amount of compressive deformation Db can be not less than 2.8 mm, for instance, not less than 3.0 mm. The golf ball 2 having an amount of compressive deformation Db of not greater than 4.0 mm can be regarded as having excellent resilience performance. From this viewpoint, the amount of compressive deformation Db can be not greater than 3.7 mm, for instance, not greater than 3.5 mm.

For measurement of the amount of compressive deformation Db, the aforementioned YAMADA type compression tester "SCH" may be used. In the tester, the golf ball 2 can be placed on a rigid plate made of metal. Next, a cylinder made of metal can gradually descend toward the golf ball 2. The golf ball 2 squeezed between the bottom face of the cylinder and the hard plate can become deformed. A movement distance of the cylinder, starting from the state in which an initial load of 98 N, for instance, can be applied to the golf ball 2 up to the state in which a final load of 1274 N, for instance, can be applied thereto, can be measured. A movement speed of the cylinder until the initial load is applied can be 0.83 mm/s, for instance. A movement speed of the cylinder after the initial load is applied until the final load is applied can be 1.67 mm/s, for instance.

EXAMPLES

Example 1

A rubber composition was obtained by kneading 100 parts by mass of a high-cis polybutadiene (trade name "BR-730", manufactured by JSR Corporation), 27.7 parts by mass of zinc acrylate (trade name "ZN-DA90S", manufactured by NISSHOKU TECHNO FINE CHEMICAL CO., LTD.), 10 parts by mass of zinc oxide (trade name "Ginrei R", manufactured by Toho Zinc Co., Ltd.), an appropriate amount of barium sulfate (product number "BD", manufactured by SAKAI CHEMICAL INDUSTRY CO., LTD.), 0.9 parts by mass of dicumyl peroxide (trade name "PERCUMYL D", manufactured by NOF CORPORATION), 3 parts by mass of benzoic acid (product of Tokyo Chemical Industry Co., Ltd., purity: 98% or more), and 1.2 parts by mass of a pentachlorothiophenol zinc salt (product of Tokyo Chemical Industry Co., Ltd.). This rubber composition was placed into a mold including upper and lower mold halves each having a hemispherical cavity, and heated to obtain a core with a diameter of 38.6 mm. The crosslinking temperature was 160° C. The crosslinking time was 20 minutes. The hardness distribution of the core is shown in Table 1 below.

A resin composition M1 was obtained by kneading 50 parts by mass of an ionomer resin (aforementioned "HIMILAN AM7329"), 50 parts by mass of another ionomer resin (aforementioned "HIMILAN 7337"), 6 parts by mass of barium sulfate, and 4 parts by mass of titanium dioxide with a twin-screw kneading extruder. The core was placed into a mold including upper and lower mold halves each having a hemispherical cavity. The melted resin composition M1 was injected so as to cover the core in an injection molding machine to form amid layer. The thickness of the mid layer was 1.00 mm.

A resin composition C2 was obtained by kneading 35 parts by mass of an ionomer resin (aforementioned "HIMILAN 1855"), 40 parts by mass of another ionomer resin (aforementioned "HIMILAN AM7327"), 25 parts by mass of an unneutralized binary copolymer (aforementioned "NUCREL N1050H"), and 4 parts by mass of titanium dioxide with a twin-screw kneading extruder. The sphere consisting of the core and the mid layer was placed into a mold including upper and lower mold halves each having a hemispherical cavity. The melted resin composition C2 was injected so as to cover the sphere in an injection molding machine to form a cover. The thickness of the cover was 1.05 mm.

A clear paint including a two-component curing type polyurethane as a base material was applied to this cover to obtain a golf ball of Example 1 having a diameter of about 42.7 mm and a mass of about 45.5 g.

Examples 2 to 7 and Comparative Examples 1 to 13

Golf balls of Examples 2 to 7 and Comparative Examples 1 to 13 were obtained in the same manner as Example 1, except that the specifications of the core, the mid layer, and the cover were set as shown in Tables 6 to 9 below. The specifications of the core are shown in Tables 1 and 2 below. The composition of the mid layer is shown in Table 3 below. The composition of the cover is shown in Tables 4 and 5 below.

TABLE 1

| Specifications of Core | | | | | |
|---|---|---|---|---|---|
| | A | B | C | D | E |
| Polybutadiene | 100 | 100 | 100 | 100 | 100 |
| Zinc acrylate | 26.2 | 26.7 | 27.2 | 27.7 | 28.7 |
| Zinc oxide | 10 | 10 | 10 | 10 | 10 |
| Barium sulfate | 11.4 | 11.2 | 11.0 | 10.8 | 10.4 |
| Dicumyl peroxide | 0.9 | 0.9 | 0.9 | 0.9 | 0.9 |
| Benzoic acid | 3 | 3 | 3 | 3 | 3 |
| Pentachlorothiophenol zinc salt | 1.2 | 1.2 | 1.2 | 1.2 | 1.2 |
| Diameter | 38.6 | 38.6 | 38.6 | 38.6 | 38.6 |
| Compressive deformation Dc [mm] | 4.40 | 4.35 | 4.30 | 4.25 | 4.15 |

TABLE 1-continued

| Specifications of Core | | | | | |
|---|---|---|---|---|---|
| | A | B | C | D | E |
| Hardness [Shore C] | | | | | |
| Ho | 46 | 47 | 48 | 49 | 50 |
| H5 | 58 | 59 | 59 | 60 | 61 |
| H10 | 62 | 63 | 63 | 64 | 64 |
| H15 | 74 | 75 | 76 | 77 | 77 |
| Hs | 79 | 80 | 80 | 81 | 81 |
| Hs − Ho | 33 | 33 | 32 | 32 | 31 |

Ho: Central hardness

H5: Hardness at position of 5.0 mm from center

H10: Hardness at position of 10.0 mm from center

H15: Hardness at position of 15.0 mm from center

Hs: Surface hardness

TABLE 2

| Specifications of core | | | | | |
|---|---|---|---|---|---|
| | F | G | H | I | J |
| Polybutadiene | 100 | 100 | 100 | 100 | 100 |
| Zinc acrylate | 29.2 | 30.2 | 31.2 | 32.3 | 22 |
| Zinc oxide | 10 | 10 | 10 | 10 | 10 |
| Barium sulfate | 10.2 | 9.8 | 9.5 | 9.1 | 15 |
| Dicumyl peroxide | 0.9 | 0.9 | 0.9 | 0.9 | 0.9 |
| Benzoic acid | 3 | 3 | 3 | 3 | 2 |
| Pentachlorothiophenol zinc salt | 1.2 | 1.2 | 1.2 | 1.2 | 0.8 |
| Diameter | 38.6 | 38.6 | 38.6 | 38.6 | 38.6 |
| Compressive deformation Dc [mm] | 4.10 | 4.00 | 3.90 | 3.80 | 4.15 |
| Hardness [Shore C] | | | | | |
| Ho | 50 | 51 | 52 | 53 | 54 |
| H5 | 61 | 62 | 63 | 64 | 63 |
| H10 | 65 | 66 | 67 | 69 | 65 |
| H15 | 78 | 79 | 79 | 81 | 76 |
| Hs | 82 | 83 | 83 | 85 | 81 |
| Hs − Ho | 32 | 32 | 31 | 32 | 27 |

Ho: Central hardness

H5: Hardness at position of 5.0 mm from center

H10: Hardness at position of 10.0 mm from center

H15: Hardness at position of 15.0 mm from center

Hs: Surface hardness

TABLE 3

| Composition of mid layer [parts by mass] | | | | |
|---|---|---|---|---|
| | M1 | M2 | M3 | M4 |
| HIMILAN AM7329 Neutralization: Zn | 50 | 40 | 30 | 40 |
| HIMILAN AM7337 Neutralization: Na | 50 | 30 | 40 | 20 |
| HIMILAN 1555 Neutralization: Na | 0 | 30 | 25 | 30 |
| TEFABLOC T3221C | 0 | 0 | 5 | 10 |
| Barium sulfate | 6 | 6 | 6 | 6 |
| Titanium dioxide | 4 | 4 | 4 | 4 |
| Melt flow rate [g/10 min] | 4.5 | 4.7 | 4.6 | 4.7 |
| Hardness [Shore D] | 69 | 67 | 65 | 62 |
| Bending stiffness [MPa] | 347 | 324 | 304 | 240 |

TABLE 4

| Composition of cover [parts by mass] | | | | |
|---|---|---|---|---|
| | C1 | C2 | C3 | C4 |
| HIMILAN 1855 Neutralization: Zn | 80 | 35 | 25 | 0 |
| HIMILAN AM7327 Neutralization: Zn | 0 | 40 | 55 | 80 |
| HIMILAN 1555 Neutralization: Na | 0 | 0 | 0 | 0 |
| HIMILAN 1557 Neutralization: Zn | 0 | 0 | 0 | 5 |
| NUCREL N1050H | 20 | 25 | 20 | 15 |
| TEFABLOC T3221C | 0 | 0 | 0 | 0 |
| Titanium dioxide | 4 | 4 | 4 | 4 |
| P(I) [parts by mass] | 80 | 75 | 80 | 85 |
| P(Zn) [parts by mass] | 80 | 75 | 80 | 85 |
| P(Na) [parts by mass] | 0 | 0 | 0 | 0 |
| P(n) [parts by mass] | 20 | 25 | 20 | 15 |
| Melt flow rate [g/10 min] | 6.6 | 11.0 | 10.7 | 11.5 |
| Hardness [Shore D] | 50 | 47 | 45 | 42 |
| Bending stiffness [MPa] | 67 | 54 | 47 | 41 |

TABLE 5

| Composition of cover [parts by mass] | | | | |
|---|---|---|---|---|
| | C5 | C6 | C7 | C8 |
| HIMILAN 1855 Neutralization: Zn | 0 | 0 | 0 | 0 |
| HIMILAN AM7327 Neutralization: Zn | 0 | 0 | 0 | 0 |
| HIMILAN 1555 Neutralization: Na | 30 | 50 | 50 | 50 |
| HIMILAN 1557 Neutralization: Zn | 30 | 25 | 20 | 15 |
| NUCREL N1050H | 0 | 0 | 0 | 0 |
| TEFABLOC T3221C | 40 | 25 | 30 | 35 |
| Titanium dioxide | 4 | 4 | 4 | 4 |
| P(I) [parts by mass] | 60 | 75 | 70 | 65 |
| P(Zn) [parts by mass] | 30 | 25 | 20 | 15 |
| P(Na) [parts by mass] | 30 | 50 | 50 | 50 |
| P(n) [parts by mass] | 40 | 25 | 30 | 35 |
| Melt flow rate [g/10 min] | 6.8 | 7.6 | 7.8 | 8.0 |
| Hardness [Shore D] | 39 | 47 | 45 | 42 |
| Bending stiffness [MPa] | 31 | 59 | 49 | 42 |

[Scuff Resistance]

A sand wedge (trade name "XXIO 12 (made in 2021)", manufactured by Sumitomo Rubber Industries, Ltd., shaft hardness: R) was attached to a swing machine manufactured by Golf Laboratories, Inc. A golf ball was hit with this sand wedge under a condition of a head speed of 36 in/sec. The appearance of the cover was visually observed and rated based on the following criteria.

Fe: good

IF: fine split is observed.

The results are shown in Tables 6 to 9 below.

[Moldability]

A golf ball was obtained with the injection pressure of the injection molding machine being set to a value lower by 10%. The appearance of the cover was visually observed and rated based on the following criteria.

Fe (Ferior): good

IF (Inferior): bareness is observed.

The results are shown in Tables 6 to 9 below.

[Flight Performance]

A driver (W #1, trade name "XXIO 1 (made in 2021)", manufactured by Sumitomo Rubber Industries, Ltd., shaft hardness: R) was attached to a swing machine manufactured by Golf Laboratories, Inc. A golf ball was hit with this driver under a condition of a head speed of 40 m/sec, and the distance from the launch point to the stop point was measured. During the test, the weather was almost windless. The average value of flight distances obtained by 12 measurements was calculated. Furthermore, the average value was rated based on the following criteria.

A: 199.0 m or more

B: 198.0 m or more but less than 199.0 m

C: less than 198.0 m

These results are shown in Tables 6 to 9 below.

[Spin Performance]

A sand wedge (trade name "XXIO 12 (made in 2021)", manufactured by Sumitomo Rubber Industries, Ltd., shaft hardness: R) was attached to a swing machine manufactured by Golf Laboratories, Inc. A golf ball was hit with this sand wedge under a condition of a head speed of 16 m/sec. The golf ball was continuously photographed immediately after hitting, and the rate of the backspin was measured. The average value of spin rates obtained by 12 measurements was calculated. Furthermore, the average value was rated based on the following criteria.

A: 2250 rpm or more

B: 2150 rpm or more but less than 2250 rpm

C: less than 2150 rpm

These results are shown in Tables 6 to 9 below.

[Overall Evaluation]

The overall performance based on scuff resistance, moldability, flight performance, and spin performance was rated based on the following criteria.

A: There are no "IF" and "C" and the number of "B" is 1 or 0.

B: There are no "IF" and "C" and the number of "B" is 2.

C: There is "IF" or "C" and the total number of "IF" or "C" is 1.

D: There is "IF" or "C" and the total number of "IF" or "C" is 2 or more.

The results are shown in Tables 6 to 9 below.

TABLE 6

| Evaluation results | | | | | |
|---|---|---|---|---|---|
| | Comp. Ex. 1 | Ex. 1 | Ex. 2 | Ex. 3 | Comp. Ex. 2 |
| Core | J | D | F | G | H |
| $H_s - H_o$ [Shore C] | 27 | 31 | 32 | 32 | 31 |
| Compressive deformation $D_c$ [mm] | 4.15 | 4.25 | 4.10 | 4.00 | 3.90 |
| Mid layer | M2 | M1 | M1 | M1 | M1 |
| $H_m$ [Shore D] | 67 | 69 | 69 | 69 | 69 |
| $T_m$ [mm] | 1.00 | 1.00 | 1.00 | 1.00 | 1.00 |
| $M_m$ | 4.1 | 4.3 | 4.3 | 4.3 | 4.3 |
| $F_m$ [MPa] | 324 | 347 | 347 | 347 | 347 |
| Cover | C1 | C2 | C3 | C4 | C5 |
| P(I) [parts by mass] | 80 | 75 | 80 | 85 | 60 |
| P(Zn) [parts by mass] | 80 | 75 | 80 | 85 | 30 |
| P(Na) [parts by mass] | 0 | 0 | 0 | 0 | 30 |
| P(n) [parts by mass] | 20 | 25 | 20 | 15 | 40 |
| $H_c$ [Shore D] | 50 | 47 | 45 | 42 | 39 |
| $T_c$ [mm] | 1.05 | 1.05 | 1.05 | 1.05 | 1.05 |
| $M_c$ [g/10 min] | 6.6 | 11.0 | 10.7 | 11.5 | 6.8 |
| $F_c$ [MPa] | 67 | 54 | 47 | 41 | 31 |
| $P_m = F_m/(H_m * T_m)$ | 4.8 | 5.0 | 5.0 | 5.0 | 5.0 |
| $P_c = F_c/(H_c * T_c)$ | 1.3 | 1.1 | 1.0 | 0.9 | 0.8 |
| $P_m - P_c$ | 3.6 | 3.9 | 4.0 | 4.1 | 4.3 |
| $M_c * T_c$ | 6.9 | 11.6 | 11.2 | 12.1 | 7.1 |
| Compressive deformation $D_b$ [mm] | 3.2 | 3.2 | 3.2 | 3.2 | 3.2 |
| Scuff resistance | Fe | Fe | Fe | Fe | IF |
| Moldability | IF | Fe | Fe | Fe | IF |

TABLE 6-continued

| | Comp. Ex. 1 | Ex. 1 | Ex. 2 | Ex. 3 | Comp. Ex. 2 |
|---|---|---|---|---|---|
| | Evaluation results | | | | |
| Flight distance [m] | 199.3 | 199.1 | 198.5 | 198.1 | 196.9 |
| Flight distance rank | A | A | B | B | C |
| Spin rate [rpm] | 2100 | 2160 | 2240 | 2360 | 2480 |
| Spin rank | C | B | B | A | A |
| Overall evaluation | D | A | B | A | D |

TABLE 7

| | Ex. 4 | Ex. 5 | Comp. Ex. 3 | Ex. 6 | Ex. 7 |
|---|---|---|---|---|---|
| | Evaluation results | | | | |
| Core | D | F | G | C | E |
| Hs – Ho [Shore C] | 31 | 32 | 32 | 32 | 32 |
| Compressive deformation Dc [mm] | 4.25 | 4.10 | 4.00 | 4.30 | 4.15 |
| Mid layer | M2 | M3 | M4 | M1 | M1 |
| Hm [Shore D] | 67 | 65 | 62 | 69 | 69 |
| Tm [mm] | 1.00 | 1.00 | 1.00 | 1.10 | 0.95 |
| Mm | 4.7 | 4.6 | 4.7 | 4.3 | 4.3 |
| Fm [MPa] | 324 | 304 | 240 | 347 | 347 |
| Cover | C2 | C2 | C2 | C2 | C2 |
| P(I) [parts by mass] | 75 | 75 | 75 | 75 | 75 |
| P(Zn) [parts by mass] | 75 | 75 | 75 | 75 | 75 |
| P(Na) [parts by mass] | 0 | 0 | 0 | 0 | 0 |
| P(n) [parts by mass] | 25 | 25 | 25 | 25 | 25 |
| Hc [Shore D] | 47 | 47 | 47 | 47 | 47 |
| Tc [mm] | 1.05 | 1.05 | 1.05 | 0.95 | 1.10 |
| Mc [g/10 min] | 11.0 | 11.0 | 11.0 | 11.0 | 11.0 |
| Fc [MPa] | 54 | 54 | 54 | 54 | 54 |
| Pm = Fm/(Hm * Tm) | 4.8 | 4.7 | 3.9 | 4.6 | 5.3 |
| Pc = Fc/(Hc * Tc) | 1.1 | 1.1 | 1.1 | 1.2 | 1.0 |
| Pm – Pc | 3.7 | 3.6 | 2.8 | 3.4 | 4.3 |
| Mc * Tc | 11.6 | 11.6 | 11.6 | 10.5 | 12.1 |
| Compressive deformation Db [mm] | 3.2 | 3.2 | 3.2 | 3.2 | 3.2 |
| Scuff resistance | Fe | Fe | Fe | Fe | Fe |
| Moldability | Fe | Fe | Fe | Fe | Fe |
| Flight distance [m] | 198.5 | 198.0 | 197.1 | 199.7 | 198.8 |
| Flight distance rank | B | B | C | A | B |
| Spin rate [rpm] | 2220 | 2280 | 2373 | 2150 | 2190 |
| Spin rank | B | A | A | B | B |
| Overall evaluation | B | A | C | A | B |

TABLE 8

| | Comp. Ex. 4 | Comp. Ex. 5 | Comp. Ex. 6 | Comp. Ex. 7 | Comp. Ex. 8 |
|---|---|---|---|---|---|
| | Evaluation results | | | | |
| Core | B | A | F | G | B |
| Hs – Ho [Shore C] | 33 | 33 | 32 | 32 | 33 |
| Compressive deformation Dc [mm] | 4.35 | 4.40 | 4.10 | 4.00 | 4.35 |
| Mid layer | M1 | M1 | M1 | M1 | M1 |
| Hm [Shore D] | 69 | 69 | 69 | 69 | 69 |
| Tm [mm] | 1.20 | 1.30 | 0.90 | 0.80 | 1.00 |
| Mm | 4.3 | 4.3 | 4.3 | 4.3 | 4.3 |
| Fm [MPa] | 347 | 347 | 347 | 347 | 347 |
| Cover | C2 | C2 | C2 | C2 | C1 |
| P(I) [parts by mass] | 75 | 75 | 75 | 75 | 80 |
| P(Zn) [parts by mass] | 75 | 75 | 75 | 75 | 80 |
| P(Na) [parts by mass] | 0 | 0 | 0 | 0 | 0 |
| P(n) [parts by mass] | 25 | 25 | 25 | 25 | 20 |
| Hc [Shore D] | 47 | 47 | 47 | 47 | 50 |
| Tc [mm] | 0.85 | 0.75 | 1.15 | 1.25 | 1.05 |
| Mc [g/10 min] | 11.0 | 11.0 | 11.0 | 11.0 | 6.6 |
| Fc [MPa] | 54 | 54 | 54 | 54 | 67 |

TABLE 8-continued

| | Comp. Ex. 4 | Comp. Ex. 5 | Comp. Ex. 6 | Comp. Ex. 7 | Comp. Ex. 8 |
|---|---|---|---|---|---|
| | Evaluation results | | | | |
| Pm = Fm/(Hm * Tm) | 4.2 | 3.9 | 5.6 | 6.3 | 5.0 |
| Pc = Fc/(Hc * Tc) | 1.4 | 1.5 | 1.0 | 0.9 | 1.3 |
| Pm – Pc | 2.8 | 2.3 | 4.6 | 5.4 | 3.8 |
| Mc * Tc | 9.4 | 8.3 | 12.7 | 13.8 | 6.9 |
| Compressive deformation Db [mm] | 3.2 | 3.2 | 3.2 | 3.2 | 3.2 |
| Scuff resistance | Fe | Fe | Fe | Fe | Fe |
| Moldability | IF | IF | Fe | Fe | IF |
| Flight distance [m] | 199.9 | 200.0 | 197.8 | 197.4 | 199.9 |
| Flight distance rank | A | A | C | C | A |
| Spin rate [rpm] | 2115 | 2095 | 2190 | 2225 | 2040 |
| Spin rank | C | C | B | B | C |
| Overall evaluation | D | D | C | C | D |

TABLE 9

| | Comp. Ex. 9 | Comp. Ex. 10 | Comp. Ex. 11 | Comp. Ex. 12 | Comp. Ex. 13 |
|---|---|---|---|---|---|
| | Evaluation results | | | | |
| Core | I | D | F | G | J |
| Hs – Ho [Shore C] | 32 | 31 | 32 | 32 | 27 |
| Compressive deformation Dc [mm] | 3.80 | 4.25 | 4.10 | 4.00 | 4.15 |
| Mid layer | M4 | M1 | M1 | M1 | M1 |
| Hm [Shore D] | 62 | 69 | 69 | 69 | 69 |
| Tm [mm] | 1.00 | 1.00 | 1.00 | 1.00 | 1.00 |
| Mm | 4.7 | 4.3 | 4.3 | 4.3 | 4.3 |
| Fm [MPa] | 240 | 347 | 347 | 347 | 347 |
| Cover | C5 | C6 | C7 | C8 | C2 |
| P(I) [parts by mass] | 60 | 75 | 70 | 65 | 75 |
| P(Zn) [parts by mass] | 30 | 25 | 20 | 15 | 75 |
| P(Na) [parts by mass] | 30 | 50 | 50 | 50 | 0 |
| P(n) [parts by mass] | 40 | 25 | 30 | 35 | 25 |
| Hc [Shore D] | 39 | 47 | 45 | 42 | 47 |
| Tc [mm] | 1.05 | 1.05 | 1.05 | 1.05 | 1.05 |
| Mc [g/10 min] | 6.8 | 7.6 | 7.8 | 8.0 | 11.0 |
| Fc [MPa] | 31 | 59 | 49 | 42 | 54 |
| Pm = Fm/(Hm * Tm) | 3.9 | 5.0 | 5.0 | 5.0 | 5.0 |
| Pc = Fc/(Hc * Tc) | 0.8 | 1.2 | 1.0 | 1.0 | 1.1 |
| Pm – Pc | 3.1 | 3.8 | 4.0 | 4.1 | 3.9 |
| Mc * Tc | 7.1 | 8.0 | 8.2 | 8.4 | 11.6 |
| Compressive deformation Db [mm] | 3.2 | 3.2 | 3.2 | 3.2 | 3.2 |
| Scuff resistance | IF | IF | IF | IF | Fe |
| Moldability | IF | IF | IF | IF | Fe |
| Flight distance [m] | 196.2 | 199.1 | 198.7 | 197.8 | 197.8 |
| Flight distance rank | C | A | B | C | C |
| Spin rate [rpm] | 2663 | 2145 | 2220 | 2330 | 2200 |
| Spin rank | A | C | B | A | B |
| Overall evaluation | D | D | D | D | C |

As shown in Tables 6 to 9, the golf ball of each Example has excellent overall performance. From the evaluation results, advantages of the present disclosure are clear.

Disclosure Items

Each of the following items is a disclosure of a preferred embodiment.

Item 1

A golf ball including: a core, a mid layer which is positioned outside the core and whose material is a resin composition, and a cover which is positioned outside the mid layer and whose material is another resin composition, wherein a principal component of a base resin of the resin composition of the mid layer is an ionomer resin, the cover has a hardness Hc (Shore D) of not greater than 50, a principal component of a base resin of the resin composition of the cover is an ionomer resin, an amount P(I) of the ionomer resin in the base resin of the cover is not less than 60 parts by mass per 100 parts by mass of the base resin, an amount P(Na) of a sodium ion-neutralized ionomer resin in the base resin of the cover is not greater than 5 parts by mass per 100 parts by mass of the base resin, and the golf ball satisfies the following mathematical formulas (1) and (2):

$$Fm/(Hm*Tm) - Fc/(Hc*Tc) \geq 3.0, \text{ and} \qquad (1)$$

$$Mc*Tc \geq 10.0, \qquad (2)$$

where

Hm: hardness (Shore D) of the mid layer,

Tm: thickness (mm) of the mid layer,

Fm: bending stiffness (MPa) of the mid layer,

Tc: thickness (mm) of the cover,

Fc: bending stiffness (MPa) of the cover, and

Mc: melt flow rate (g/10 min) of the cover at a temperature of 190° C. under a load of 2.16 Kg.

Item 2

The golf ball according to Item 1, wherein an amount P(Zn) of a zinc ion-neutralized ionomer resin in the base resin of the cover is not less than 60 parts by mass per 100 parts by mass of the base resin.

Item 3

The golf ball according to Item 1 or 2, wherein the base resin of the cover includes a resin which is a binary copolymer formed with an olefin and an α,β-unsaturated carboxylic acid and is not neutralized, and/or a resin which is a ternary copolymer formed with an olefin, an α,β-unsaturated carboxylic acid, and an α,β-unsaturated carboxylic acid ester and is not neutralized, and a total amount P(n) of the binary copolymer and the ternary copolymer is not less than 10 parts by mass and not greater than 40 parts by mass per 100 parts by mass of the base resin.

Item 4

The golf ball according to any one of Items 1 to 3, wherein a difference (Hs−Ho) between a surface hardness Hs (Shore C) of the core and a central hardness Ho (Shore C) of the core is not less than 28.

Item 5

The golf ball according to any one of Items 1 to 4, wherein the mid layer has a bending stiffness Fm of not less than 300 MPa, and the cover has a bending stiffness Fc of not greater than 60 MPa.

Item 6

The golf ball according to any one of Items 1 to 5, wherein the cover has a thickness Tc of not greater than 1.20 mm.

Item 7

The golf ball according to any one of Items 1 to 6, wherein the cover has a melt flow rate Mc of not less than 8.0 g/10 min.

Item 8

The golf ball according to any one of Items 1 to 7, wherein a ratio of the amount P(I) of an amount P(Zn) of a zinc ion-neutralized ionomer resin to the ionomer resin in the base resin of the cover is not less than 90%.

Item 9

The golf ball according to any one of Items 1 to 8, wherein the base resin of the cover includes a first zinc ion-neutralized ionomer resin and a second zinc ion-neutralized ionomer resin.

Item 10

The golf ball according to any one of Items 1 to 9, the core has a diameter of not less than 35.0 mm and not greater than 40.5 mm, the core has an amount of compressive deformation Dc of not less than 3.0 mm and not greater than 5.0 mm, and the core has a surface hardness Hs of not less than 70 and not greater than 95.

Item 11

The golf ball according to any one of Items 1 to 10, wherein the mid layer has a thickness Tm of not less than 0.5 mm and not greater than 2.0 mm, the mid layer has a hardness Hm of not less than 50 and not greater than 90.

Item 12

The golf ball according to any one of Items 1 to 11, wherein the golf ball has a diameter of not less than 40 mm and not greater than 45 mm, the golf ball has a mass of not less than 40 g and not greater than 50 g, and the golf ball has an amount of compressive deformation Db of not less than 2.5 mm and not greater than 4.0 mm.

Item 13

A golf ball comprising: a core, a mid layer which is positioned outside the core and whose material is a resin composition, and a cover which is positioned outside the mid layer and whose material is another resin composition, wherein the cover has a thickness Tc of not greater than 1.20 mm, the cover has a hardness Hc (Shore D) of not greater than 50, a principal component of a base resin of the resin composition of the mid layer is an ionomer resin, a principal component of a base resin of the resin composition of the cover is an ionomer resin, an amount P(I) of the ionomer resin in the base resin of the cover is not less than 60 parts by mass per 100 parts by mass of the base resin, a ratio of an amount P(Zn) of a zinc ion-neutralized ionomer resin to the amount P(I) of the ionomer resin in the base resin of the cover is not less than 90%, and the golf ball satisfies the following mathematical formulas (1) and (2):

$$Fm/(Hm * Tm) - Fc/(Hc * Tc) \geq 3.0, \text{ and} \qquad (1)$$

$$Mc * Tc \geq 10.0, \qquad (2)$$

where

Hm: hardness (Shore D) of the mid layer,

Tm: thickness (mm) of the mid layer,

Fm: bending stiffness (MPa) of the mid layer,

Tc: thickness (mm) of the cover,

Fc: bending stiffness (MPa) of the cover, and

Mc: melt flow rate (g/10 min) of the cover at a temperature of 190° C. under a load of 2.16 Kg.

Item 14

The golf ball according to Item 13, wherein a ratio of the amount P(Zn) to the amount P(I) is 100%.

Item 15

The golf ball according to Item 13 or Item 14, wherein the core has a central hardness Ho of not less than 40 and not greater than 65.

Item 16

The golf ball according to any one of Items 13 to 15, wherein the cover has a bending stiffness Fc of not greater than 80 MPa, and the cover has a thickness Tc of not less than 0.50 mm and not greater than 2.00 mm.

The above-described golf ball is suitable for, for example, playing golf on golf courses and practicing at driving ranges.

What is claimed is:

1. A golf ball comprising:

a core, a mid layer outside the core and whose material is a resin composition, and a cover outside the mid layer and whose material is another resin composition, wherein a principal component of a base resin of the resin composition of the mid layer is an ionomer resin, the cover has a hardness Hc (Shore D) of not greater than 50, a principal component of a base resin of the resin composition of the cover is an ionomer resin, an amount P(I) of the ionomer resin in the base resin of the cover is not less than 60 parts by mass per 100 parts by mass of the base resin, an amount P(Na) of a sodium ion-neutralized ionomer resin in the base resin of the cover is not greater than 5 parts by mass per 100 parts by mass of the base resin, and the golf ball satisfies the following mathematical formulas (1) and (2):

$$Fm/(Hm * Tm) - Fc/(Hc * Tc) \geq 3.0, \text{ and} \qquad (1)$$

$$Mc * Tc \geq 10.0, \qquad (2)$$

where

Hm: hardness (Shore D) of the mid layer,

Tm: thickness (mm) of the mid layer,

Fm: bending stiffness (MPa) of the mid layer,

Tc: thickness (mm) of the cover,

Fc: bending stiffness (MPa) of the cover, and

Mc: melt flow rate (g/10 min) of the cover at a temperature of 190° C. under a load of 2.16 Kg.

2. The golf ball according to claim 1, wherein the base resin of the cover includes a resin which is a binary copolymer formed with an olefin and an α,β-unsaturated carboxylic acid and is not neutralized, and/or a resin which is a ternary copolymer formed with an olefin, an α,β-unsaturated carboxylic acid, and an α,β-unsaturated carboxylic acid ester and is not neutralized, and a total amount P(n) of the binary copolymer and the ternary copolymer is not less than 10 parts by mass and not greater than 40 parts by mass per 100 parts by mass of the base resin.

3. The golf ball according to claim 1, wherein a difference (Hs−Ho) between a surface hardness Hs (Shore C) of the core, and a central hardness Ho (Shore C) of the core is not less than 28.

4. The golf ball according to claim 1, wherein the mid layer has a bending stiffness Fm of not less than 300 MPa, and the cover has a bending stiffness Fc of not greater than 60 MPa.

5. The golf ball according to claim 1, wherein the cover has a thickness Tc of not greater than 1.20 mm.

6. The golf ball according to claim 1, wherein the cover has a melt flow rate Mc of not less than 8.0 g/10 min.

7. The golf ball according to claim 1, wherein a ratio of an amount P(Zn) of a zinc ion-neutralized ionomer resin to the amount P(1) of the ionomer resin in the base resin of the cover is not less than 90%.

8. The golf ball according to claim 1, wherein the base resin of the cover includes a first zinc ion-neutralized ionomer resin and a second zinc ion-neutralized ionomer resin.

9. The golf ball according to claim 1, wherein the core has a diameter of not less than 35.0 mm and not greater than 40.5 mm, the core has an amount of compressive deformation Dc of not less than 3.0 mm and not greater than 5.0 mm, and the core has a surface hardness Hs of not less than 70 and not greater than 95.

10. The golf ball according to claim 1, wherein the mid layer has a thickness Tm of not less than 0.5 mm and not greater than 2.0 mm, the mid layer has a hardness Hm of not less than 50 and not greater than 90.

11. The golf ball according to claim 1, wherein
the golf ball has a diameter of not less than 40 mm and not greater than 45 mm,
the golf ball has a mass of not less than 40 g and not greater than 50 g, and
the golf ball has an amount of compressive deformation Db of not less than 2.5 mm and not greater than 4.0 mm.

12. A golf ball comprising:
a spherical core,
a mid layer outside the core and whose material is a resin composition, and
a cover outside the mid layer and whose material is another resin composition, the cover having a plurality of dimples on a surface thereof, wherein
the cover has a thickness Tc of not greater than 1.20 mm,
the cover has a hardness Hc (Shore D) of not greater than 50,
a principal component of a base resin of the resin composition of the mid layer is an ionomer resin,
a principal component of a base resin of the resin composition of the cover is an ionomer resin,
an amount P(I) of the ionomer resin in the base resin of the cover is not less than 60 parts by mass per 100 parts by mass of the base resin,
a ratio of an amount P(Zn) of a zinc ion-neutralized ionomer resin to the amount P(I) of the ionomer resin in the base resin of the cover is not less than 90%, and the golf ball satisfies the following mathematical formulas (1) and (2):

$$Fm/(Hm*Tm) - Fc/(Hc*Tc) \geq 3.0, \text{ and} \qquad (1)$$

$$Mc*Tc \geq 10.0, \qquad (2)$$

where
Hm: hardness (Shore D) of the mid layer,
Tm: thickness (mm) of the mid layer,
Fm: bending stiffness (MPa) of the mid layer,
Tc: thickness (mm) of the cover,
Fc: bending stiffness (MPa) of the cover, and
Mc: melt flow rate (g/10 min) of the cover at a temperature of 190° C. under a load of 2.16 Kg.

13. The golf ball according to claim 12, wherein a ratio of the amount P(Zn) to the amount P(I) is 100%.

14. The golf ball according to claim 12, wherein the core has a central hardness Ho of not less than 40 and not greater than 65.

15. The golf ball according to claim 12, wherein
the cover has a bending stiffness Fc of not greater than 80 MPa, and
the cover has a thickness Tc of not less than 0.50 mm and not greater than 2.00 mm.

* * * * *